(12) United States Patent
Dugas et al.

(10) Patent No.: US 7,511,907 B2
(45) Date of Patent: Mar. 31, 2009

(54) STEPPED TIME BASED SERVO PATTERN AND HEAD

(75) Inventors: Matthew P. Dugas, St. Paul, MN (US); Theodore A. Schwarz, Woodbury, MN (US)

(73) Assignee: Advanced Research Corporation, White Bear, MN (US)

( * ) Notice: Subject to any disclaimer, the term of this patent is extended or adjusted under 35 U.S.C. 154(b) by 0 days.

(21) Appl. No.: 11/060,627

(22) Filed: Feb. 17, 2005

(65) Prior Publication Data

US 2005/0195525 A1 Sep. 8, 2005

Related U.S. Application Data

(60) Provisional application No. 60/545,022, filed on Feb. 17, 2004.

(51) Int. Cl.
*G11B 5/09* (2006.01)
*G11B 21/02* (2006.01)
*G11B 5/584* (2006.01)

(52) U.S. Cl. .................. 360/48; 360/75; 360/77.12; 360/121

(58) Field of Classification Search .............. None
See application file for complete search history.

(56) References Cited

U.S. PATENT DOCUMENTS

| | | | | |
|---|---|---|---|---|
| 4,914,805 A | * | 4/1990 | Kawase | 29/603.16 |
| 5,027,244 A | * | 6/1991 | Hayakawa | 360/119 |
| 5,055,951 A | * | 10/1991 | Behr | 360/77.12 |
| 5,321,570 A | * | 6/1994 | Behr et al. | 360/121 |
| 6,081,401 A | * | 6/2000 | Varian | 360/77.01 |
| 6,169,640 B1 | | 1/2001 | Fasen | |
| 6,269,533 B2 | | 8/2001 | Dugas | |
| 6,320,719 B1 | | 11/2001 | Albrecht et al. | |
| 6,496,328 B1 | | 12/2002 | Dugas | |
| 6,700,729 B1 | | 3/2004 | Beck et al. | |
| 6,781,778 B1 | | 8/2004 | Molstad et al. | |
| 6,801,383 B2 | | 10/2004 | Zweighaft et al. | |
| 6,842,305 B2 | | 1/2005 | Molstad et al. | |
| 2003/0099057 A1 | | 5/2003 | Molstad | |
| 2003/0099059 A1 | * | 5/2003 | Nakao | 360/77.12 |
| 2005/0099713 A1 | | 5/2005 | Molstad et al. | |
| 2005/0099715 A1 | * | 5/2005 | Yip et al. | 360/48 |
| 2005/0168869 A1 | | 8/2005 | Dugas et al. | |
| 2005/0180040 A1 | * | 8/2005 | Dugas et al. | 360/48 |
| 2005/0259364 A1 | * | 11/2005 | Yip | 360/241.1 |

* cited by examiner

*Primary Examiner*—Andrew L. Sniezek
(74) *Attorney, Agent, or Firm*—Nathan J. Witzany; Dorsey & Whitney LLP

(57) ABSTRACT

The present invention relates to apparatuses and methods used in manufacturing magnetic tape. More specifically, the present invention relates to a method of writing a servo pattern on magnetic tape so as to minimize errors in the servo pattern, the heads used to write such servo data, and the magnetic tape manufactured with such heads. Errors in the servo pattern may be minimized by synthesizing the slanted transitions in a time based servo pattern using servo write gaps that are perpendicular to the tape motion. In so minimizing errors, distortion in the reading and/or writing of the data tracks can be prevented.

13 Claims, 10 Drawing Sheets

STEPPED TIME BASED SERVO PATTERN AND HEAD

CROSS-REFERENCE TO RELATED APPLICATION(S)

The present non-provisional patent application claims the benefit of U.S. provisional patent application Ser. No. 60/545,022, entitled "STEPPED TIME BASED SERVO PATTERN AND HEAD," filed on Feb. 17, 2004, the subject matter of which is hereby incorporated by reference herein in its entirety.

TECHNICAL FIELD

The present application relates to a method of synthesizing the slanted transitions in a time based servo pattern using servo write gaps that are perpendicular to the tape motion.

BACKGROUND OF THE INVENTION

Magnetic tape as a data storage medium requires the ability effectively to write and read data to data tracks of the magnetic tape; many such data tracks typically extend linearly along the length of the tape and, in part, define tape data storage density. In recent years, much higher track densities have been achieved in tape through the inclusion of a dynamic track following servo system. In linear multi-channel tape systems, this has meant the addition of dedicated servo bands on the tape and dedicated servo read sensors on the recording/playback head to more accurately derive data element position relative to the data track. The servo tracks provide for the controlled movement of tape reading and/or writing heads with respect to the data tracks. Servo tracks typically are written in such a way as to span the tape in an efficient manner that maximizes the number of data tracks and minimizes the number of servo tracks for a given tape system, thereby increasing tape data storage capacity and density.

Servo tracks extend linearly along the length of the tape and contain servo data; the servo data is used to determine the relative position of the servo read head with respect to the magnetic media in a translating direction (i.e., movement across the width of the tape). The initial servo systems were amplitude based, in which individual adjacently contiguous servo tracks within the servo band were amplitude modulated to provide the head position information. More recently, much of the tape drive industry has moved to "time based" servo patterns. In such time based servo patterns, any errors in the servo data create positioning errors that distort the reading or writing of the data tracks. To prevent such distortions, it is important to minimize such errors in the servo data. The present invention addresses methods to minimize errors in the servo data and heads and magnetic media to practice such methods.

BRIEF SUMMARY OF THE INVENTION

The present invention relates to a method of synthesizing the slanted transitions in a time based servo pattern using servo write gaps that are perpendicular to the tape motion.

In one embodiment, the present invention relates to a magnetic tape comprising a substrate and a magnetic layer, the magnetic tape having at least one servo track that includes servo data, the magnetic tape being made by writing the servo pattern using write gaps in which the slanted portions of the write gaps are synthesized by a series of short segmented vertical and horizontal segments.

In another embodiment, the magnetic tape is made by writing the servo pattern using non-contiguous write gap segments in a staggered pattern. In yet another embodiment, the magnetic tape is made by writing the servo pattern using a series of short areas of magnetic material in a staggered pattern.

The present invention also relates to an apparatus for use in writing servo data, comprising a servowriting head, a magnetic film on the servowriting head, and one or more write gaps created in the magnetic film, wherein the slanted portions of said write gaps are synthesized by a series of short segmented vertical and horizontal segments.

The present invention also relates to a method of writing servo data on a servo track, comprising writing the data with write gaps wherein the slanted portions of the write gaps are synthesized using a series of short vertical and horizontal segments.

DETAILED DESCRIPTION OF THE INVENTION

The present invention relates to apparatuses and methods used in manufacturing magnetic tape. More specifically, the present invention relates to a method of writing a servo pattern on magnetic tape so as to minimize errors in the servo pattern, the heads used to write such servo data, and the magnetic tape manufactured with such heads. Errors in the servo pattern may be minimized by synthesizing the slanted transitions in a time based servo pattern using servo write gaps that are perpendicular to the tape motion. In so minimizing errors, distortion in the reading and/or writing of the data tracks can be prevented.

Figure 1:
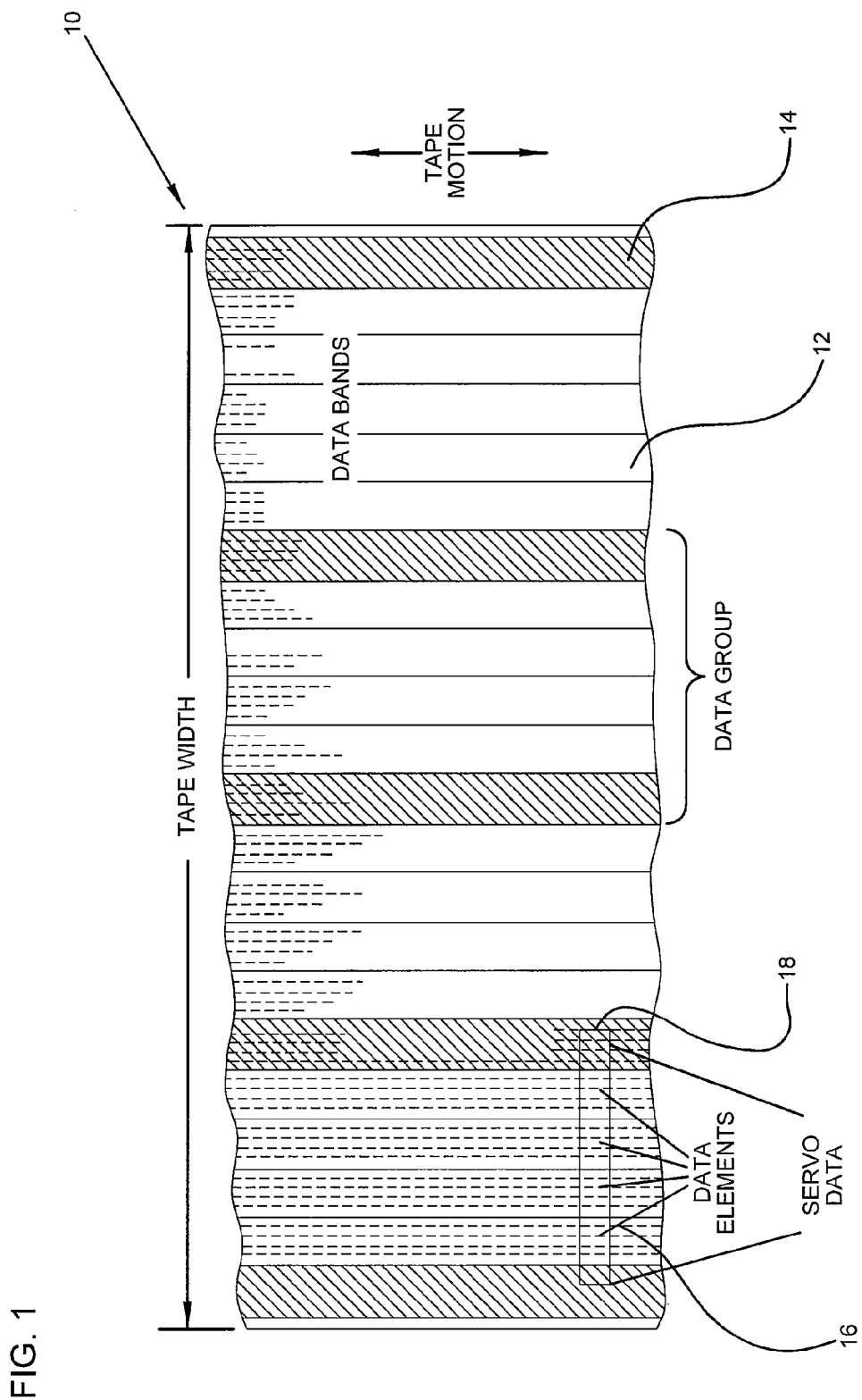
FIG. 1 shows a typical servo track and data track organization on the magnetic tape.

FIG. 1 shows a magnetic tape 10 having data bands or data tracks 12 and servo bands or servo tracks 14. The data tracks 12 are the portions of tape 10 to which data elements 16 would be written and from which data elements 16 would be read. Similarly, servo tracks 14 include servo data 18 which are written into the servo track during manufacture of the magnetic tape 10. There are usually two or more of servo tracks 14 spread across magnetic tape 10. The servo data 18 is used by the servo control system to help properly position the read and write heads with respect to the data tracks 12. The present invention relates to a method of writing the servo data 18 so as to minimize errors in the servo data 18.

Figure 2:
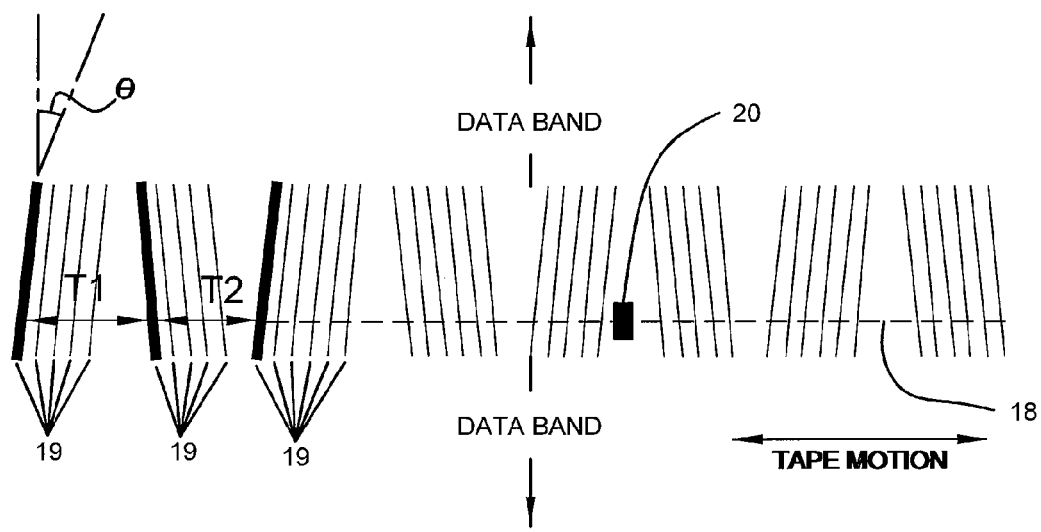
FIG. 2 shows a portion of a Linear Tape Open (LTO) type time-based servo pattern.
Figure 3:
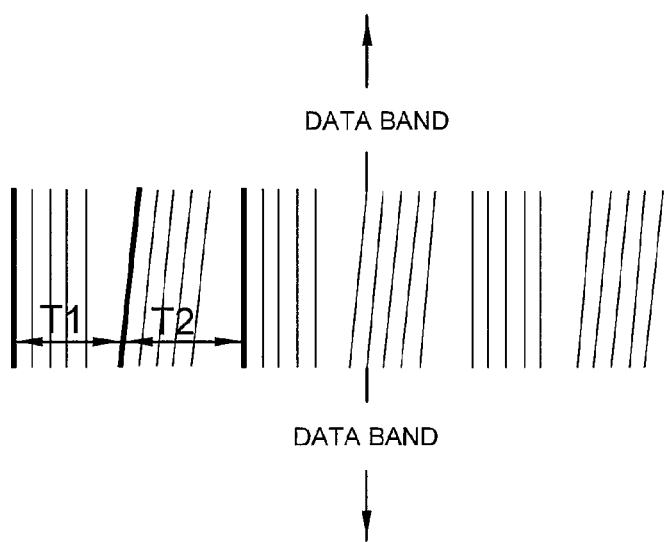
FIG. 3 shows a portion of a Vertical Reference type time-based servo pattern.

Time-based servo patterns have been well established as a means of precision recording/playback head positioning. Time based systems rely on measuring the spatial or time difference between a magnetic reference mark on magnetic tape 10 and a position mark that varies proportionately as the head traverses the magnetic tape 10 in a transverse direction. The most widely used time-based servo pattern is the Linear Tape Open (LTO) pattern. FIGS. 2 and 3 show to examples of time-based servo patterns. FIG. 2 depicts an LTO type time-based servo pattern. FIG. 3 depicts a Vertical Reference type time-based servo pattern. In both Figures, servo data 18 are written on the servo tracks 14 of magnetic tape 10. The servo data 18 are made up of transitions 19. Servo read element 20 reads the servo data 18 as it traverses magnetic tape 10.

Figure 4:
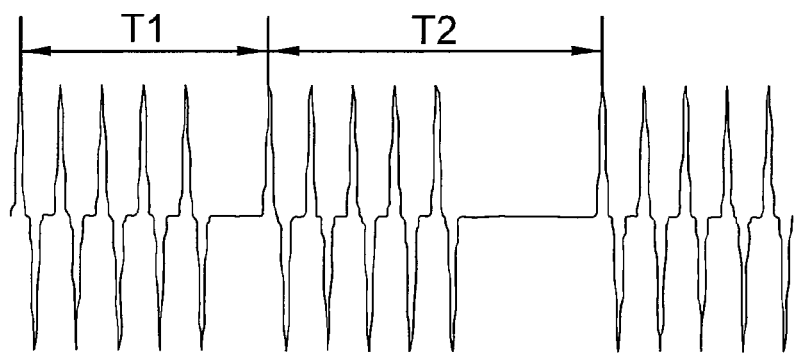
FIG. 4 shows one block of signals produced by the LTO pattern of FIG. 2, when written as uni-polar pulse.
Figure 5:
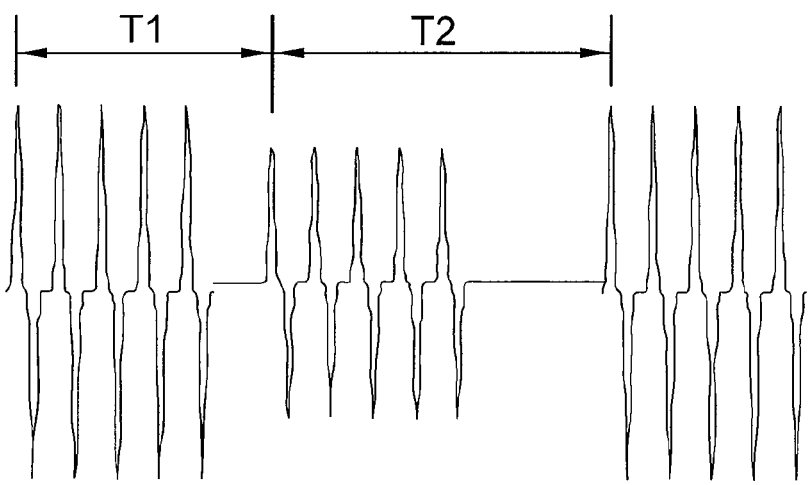
FIG. 5 shows one block of signals produced by the Vertical Reference pattern of FIG. 3, when written as uni-polar pulse.

With reference to FIGS. 2 and 3, the transverse position is derived by taking the ratio T1/T2 or T1/(T1+T2) and normalizing T1 and T2 by (T1+T2). (The latter is constant.) The transitions 19 in each group are repeated a number of times to average out noise and recording variations. In order not to degrade the signal from the servo read element 20 due to azimuth loss and readback pulse widening, the angle that each sloped transition 19 makes with the transverse axis of magnetic tape 10 must be very small. This angle, $\theta$, ranges only approximately 6 to 8 degrees. The transitions 19, written as uni-polar pulse, produce the patterns depicted in FIGS. 4 and 5. FIG. 4 depicts one block of signals from the LTO pattern shown in FIG. 2, and FIG. 5 depicts one block of signals from the Vertical Reference pattern shown in FIG. 3.

Figure 6:
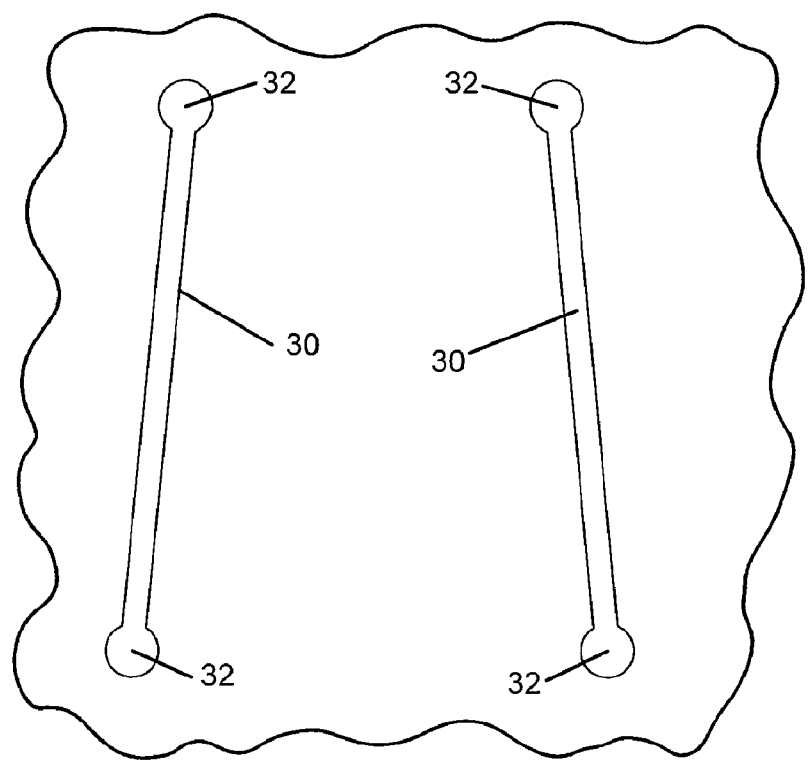
FIG. 6 shows two exemplary servo write gaps with circular opening terminations that would be created on a servowriting head to create time-based servo patterns on magnetic tape.

Servo write patterns such as those shown in FIGS. 2 and 3 are generated on magnetic tape 10 by a special servowriting head. This head typically consists of a very wide gap write head upon which a thin high magnetic moment, highly permeable, low coercivity magnetic film is deposited through sputtering or plating. Write gaps are created by etching through the film by ion milling or other lithographic processes. FIG. 6 shows sample write gaps 30. The write gaps 30 in FIG. 6 are terminated with circle openings 32 as described in U.S. application Ser. No. 10/683,809, which is a continuation-in-part of U.S. application Ser. No. 09/922,546, filed on Aug. 3, 2001, now U.S. Pat. No. 6,678,116, which is a continuation of U.S. application Ser. No. 09/255,762, filed on Feb. 23, 1999, now U.S. Pat. No. 6,269,533 for the purpose of improving the uniformity of the recorded transition and reducing the effect of edge writing into the data portion of the tape. Other configurations for the terminations of write gaps 30 are possible and commonly used.

In order to generate servo write patterns such as those shown in FIGS. 2 and 3, the write gaps 30 must be slightly angled to create sloped transitions 19 at angle $\theta$ on magnetic tape 10. At present, however, it is difficult to uniformly create write gaps 30 at a slight angle, because most pattern generators operate on an x-y grid and do not produce a true straight line at an angle. Although very small, the perturbations or irregularities that result tend to be quasi-random. The irregularities in the edges of the write gaps 30 create positioning errors. A very small error in write gap 30 in the longitudinal (tape motion) direction, $\Delta X$, causes a much larger error in the transverse direction, $\Delta Y$. This is because $\Delta Y = \Delta X / \sin \theta$. For $\theta = 7$ degrees, for example, $\Delta Y$ is approximately 9.6 times $\Delta X$.

Figure 7:
FIG. 7 shows two exemplary servo write gaps of the present invention, in which the slanted portions of the servo write gaps of FIG. 6 are replaced with a series of short segmented normal-to-the-tape-motion-direction gaps.

Hence, in the preferred embodiment of the present invention, all of the slanted portions of the write gaps 30 are replaced with vertical 60 and horizontal 62 segments. FIG. 7 shows the write gaps 30 of the present invention. In FIG. 7, the slanted gap of FIG. 6 is replaced by a series of short segmented normal-to-the-tape-motion-direction gaps. The end box terminations 34 of the servowriter write gaps 30, which reduce distortion non-linearities in the signal amplitude, are multi-sided regular polygons which approximate the circle terminations 32. It is understood that other shapes for the end box terminations 34 of the write gaps 30 may be used without departing from the scope of the present invention.

Figure 8:
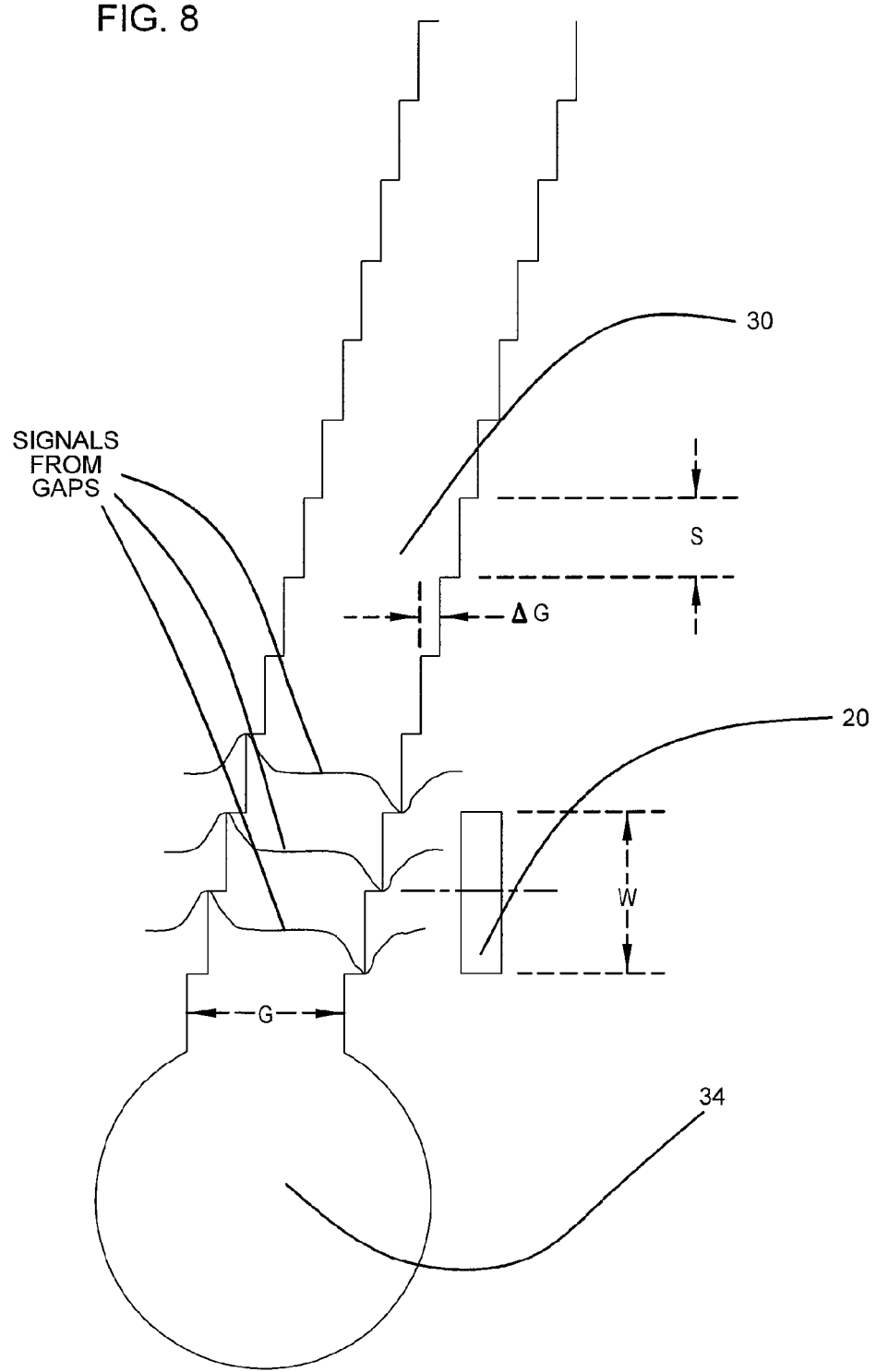
FIG. 8 shows an enlargement of a portion of the segmented write gap of FIG. 7.
Figure 10:
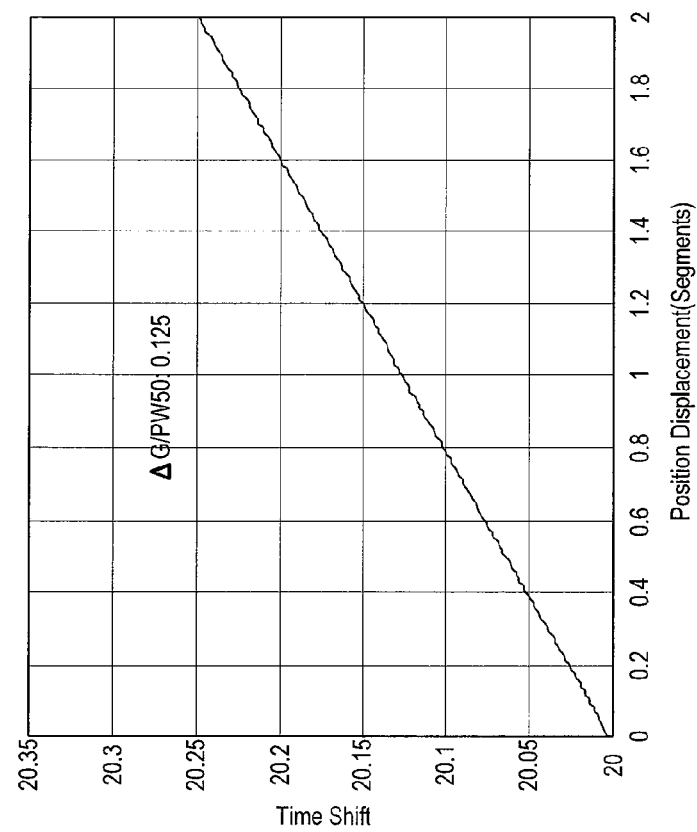
FIG. 10 is a graphical representation of a PES Signal wherein $\Delta G=0.125*PW50$.
Figure 9:
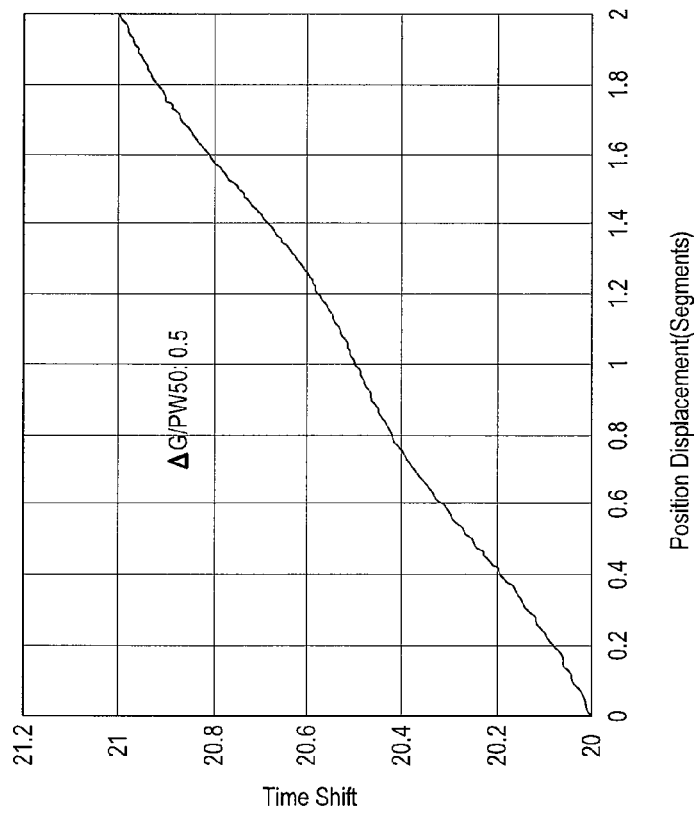
FIG. 9 is a graphical representation of a PES Signal wherein $\Delta G=0.5*PW50$.

FIG. 8 shows an enlargement of the segmented servo write gap 30 of FIG. 7. The critical parameters of the segmented write gap 30 are as follows:

1. The step in the gapline $\Delta G$ must be much smaller than the segment length S, such that $\Delta G < 0.1 * S$.
2. The step in the gapline $\Delta G$ must be much smaller than the servo writer gap width G, such that $\Delta G < 0.1 * G$.
3. The width W of the servo reader element 20 must be at least twice the segment length S, such that $W > 2 \times S$.
4. The step in the gapline $\Delta G$ must be smaller than the PW50 of the resultant isolated pulse if only a single transition were written, such that $\Delta G < 0.5 * PW50$. FIGS. 9 and 10 illustrate the last parameter wherein the cases are for $\Delta G = 0.5 * PW50$ and $\Delta G = 0.125 * PW50$.

Figure 11:
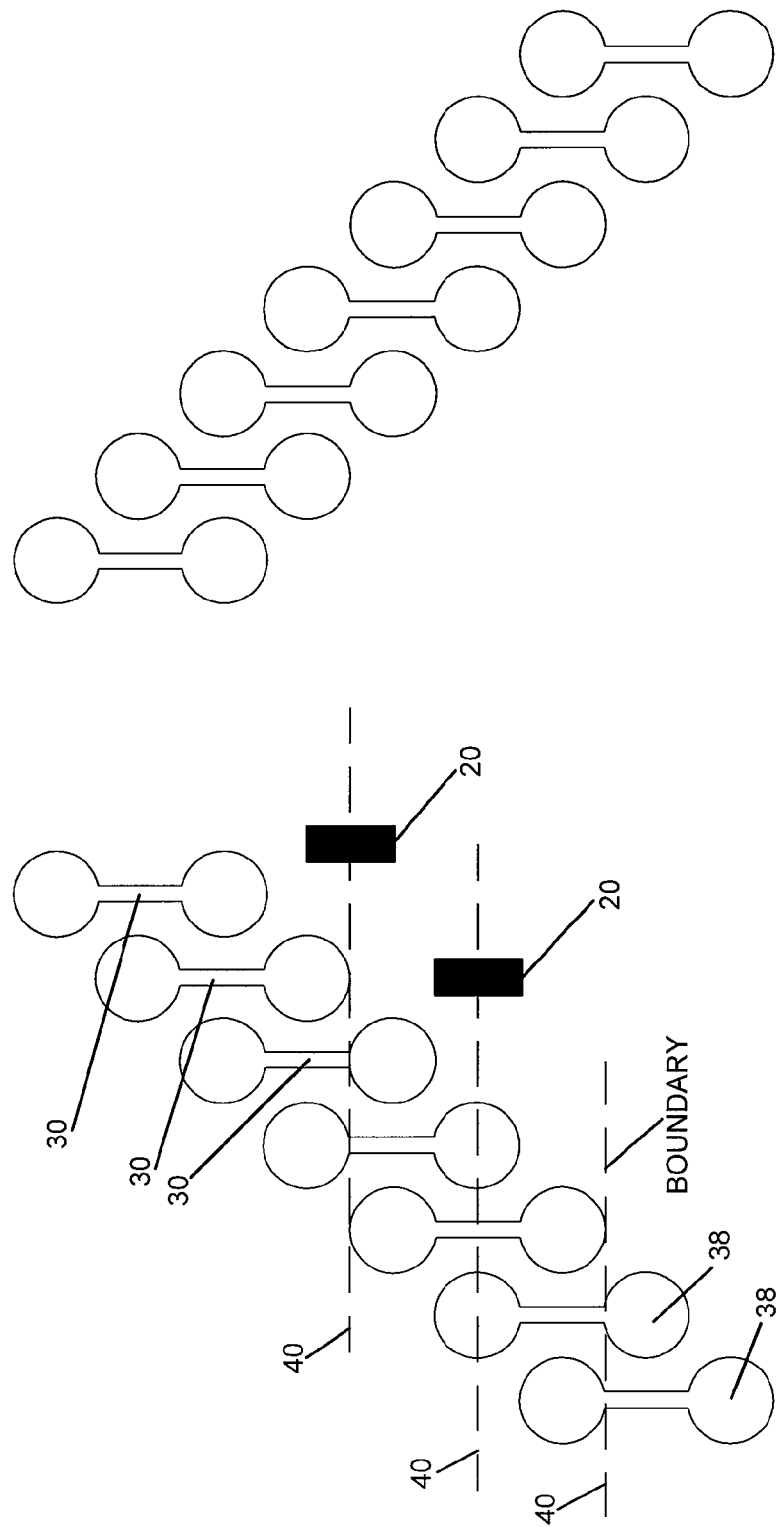
FIG. 11 shows an alternate configuration of the present invention in which the servo pattern is made up of several short non-contiguous write gap segments that are terminated by circular "boxes."

Several other configurations that employ write gaps 30 aligned with the transverse tape axis may emulate the sloped gapline of FIG. 6 and are within the scope of the present invention. FIG. 11 shows short non-contiguous write gap segments 36 that are terminated by circular "boxes" 38. These boxes 38, which are substantially larger than the write gaps 30, do not write. Hence, the configuration of FIG. 11, when energized, simultaneously writes a series of short stepped transitions. The dashed line 40 defines the boundary between one step and the other. The servo read head 20 is shown centered on one step and at the transition of two steps and provides a PES similar to the configuration of FIG. 8.

Figure 12:
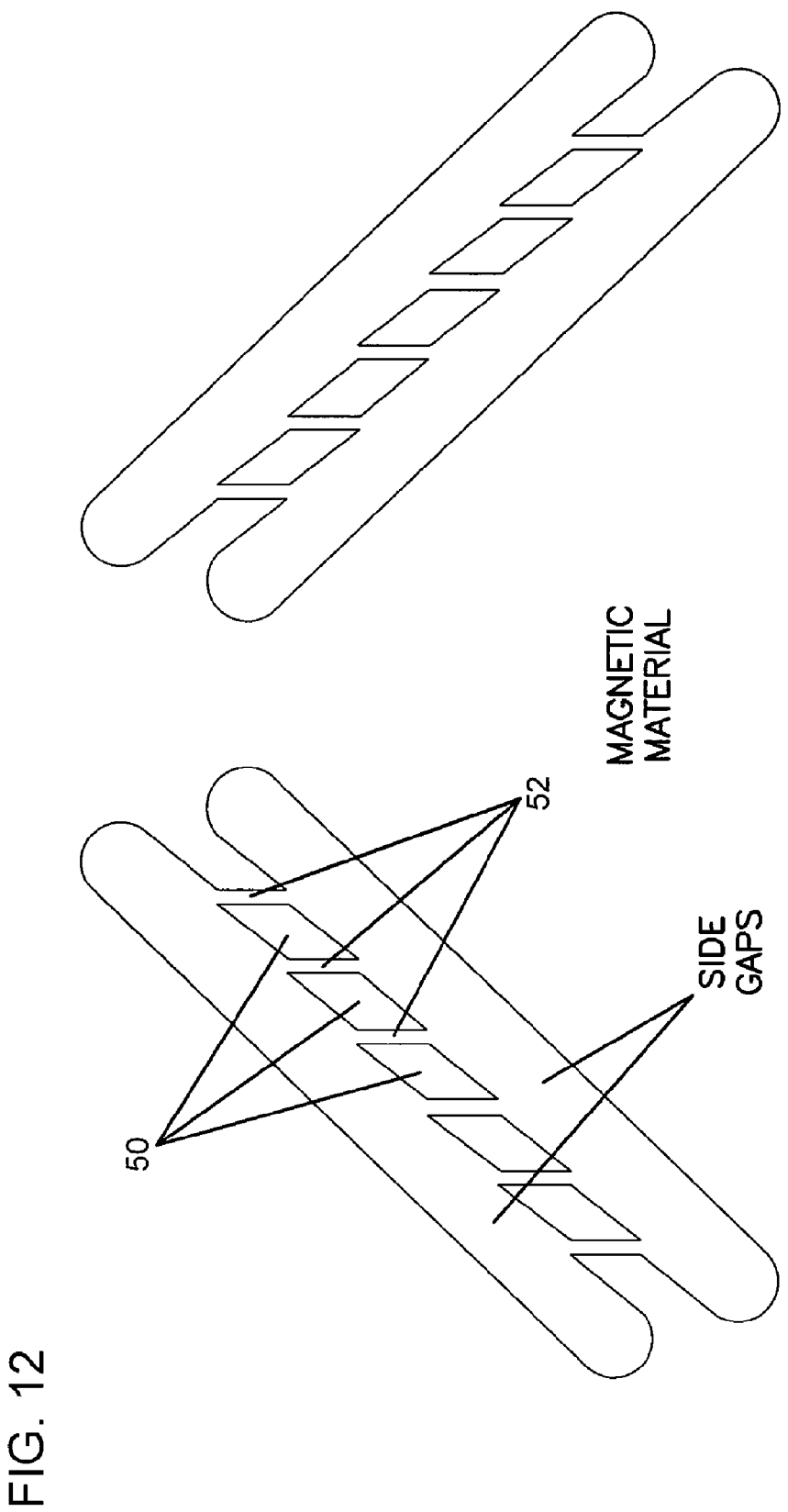
FIG. 12 shows an alternative configuration of the present invention in which a series of short "islands" of magnetic material conduct the magnetic flux between the write gaps.
Figure 13:
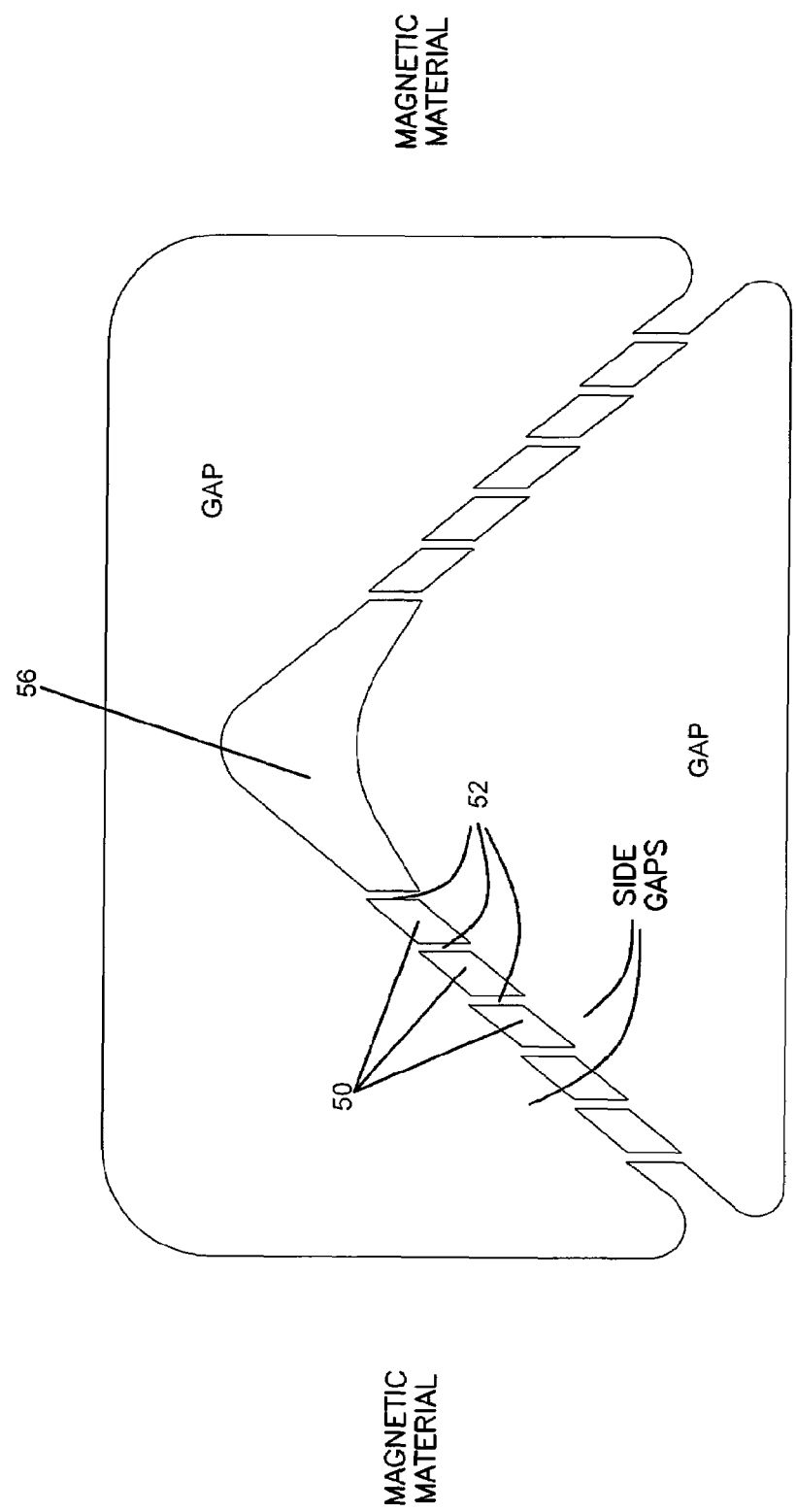
FIG. 13 shows an alternative to the configuration of FIG. 12, in which the flux is concentrated on the magnetic islands and across a bridge for more efficiency.

The configuration shown in FIG. 12 is unique in that it provides for a series of short "islands" of magnetic material 50 to conduct the magnetic flux between the write gaps 52. FIG. 13 depicts an alternative to the configuration of FIG. 12. In FIG. 13, the flux is concentrated on the magnetic islands 50 and across the bridge 56 for more efficiency. In the configurations shown in both FIGS. 12 and 13, there is little sidewriting because the sloping portions of the islands 50 are so far away from the adjacent gaps 52. Further, because they do no write, the edges of the sloped portions of the islands 50 are not critical to the integrity of the written pattern.

In that the foregoing description of the present invention discloses only exemplary embodiments thereof, it is to be understood that other variations are contemplated as being within the scope of the present invention. For example, although the LTO pattern has been used as an example, these techniques can be applied to any slanted gap line and still achieve good linearity. The present invention is not limited in the particular embodiments which have been described in detail herein. Rather, reference should be made to the appended claims as indicative of the scope and content of the present invention.

What is claimed is:

1. Magnetic tape comprising a substrate and a magnetic layer, the magnetic tape having at least one servo track that includes servo data and having a servo pattern comprising write gaps in which slanted, non-perpendicular to the tape motion portions of the write gaps are synthesized by a series of short, staggered, normal to the tape motion segments.

2. The magnetic tape of claim 1, wherein the magnetic tape is made by writing a servo pattern using write gaps in which slanted, non-perpendicular to the tape motion portions of the write gaps are synthesized by a series of short, staggered, normal to the tape motion segments and wherein the normal to the tape motion segments are terminated with circular openings.

3. The magnetic tape of claim 1, wherein the normal to the tape motion segments are connected by segments perpendicular to the normal to the tape motion segments.

4. The magnetic tape of claim 1, wherein the segments perpendicular to the normal to the tape motion segments are much smaller than the width of the write gaps.

5. Magnetic tape comprising a substrate and a magnetic layer, the magnetic tape having at least one servo track that includes servo data, the servo data comprising a servo pattern simulating a slanted magnetic transition in each of one or more of the at least one servo track comprising non-contiguous write gap segments in a staggered pattern.

6. The magnetic tape of claim 5, wherein the magnetic tape is made by writing a servo pattern simulating a slanted magnetic transition to each of one or more of the at least one servo track using non-contiguous write gap segments, terminated with circular openings, in a staggered pattern.

7. The magnetic tape of claim 6, wherein the circular openings are larger than the write gap segments.

8. Magnetic tape comprising a substrate and a magnetic layer, the magnetic tape having at least one timing-based servo track that includes servo data, the servo data comprising a magnetic transition of a timing-based servo pattern in each of one or more of the at least one timing-based servo track comprising a series of short areas of magnetic material in a staggered pattern.

9. An apparatus for use in writing servo data on a magnetic tape, comprising:
   a servowriting head;
   a magnetic film on the head; and
   one or more write gaps created in the magnetic film, wherein slanted, non-perpendicular to the tape motion portions of said write gaps are synthesized by a series of short, staggered, normal to the tape motion segments and segments perpendicular to the normal to the tape motion segments, wherein the segments perpendicular to the normal to the tape motion segments are much smaller than the width of the write gaps.

10. The apparatus of claim 9, wherein the write gaps are terminated with circular openings.

11. The apparatus of claim 9, wherein the segments perpendicular to the normal to the tape motion segments are much smaller than the normal to the tape motion segments of the write gaps.

12. A method of writing servo data on a servo track of a magnetic tape, comprising writing said data with write gaps, wherein slanted, non-perpendicular to the tape motion portions of said write gaps are synthesized by a series of short, staggered, normal to the tape motion.

13. The method of claim 12, wherein the normal to the tape motion segments are terminated with circular openings.

* * * * *

UNITED STATES PATENT AND TRADEMARK OFFICE
CERTIFICATE OF CORRECTION

PATENT NO. : 7,511,907 B2  Page 1 of 1
APPLICATION NO. : 11/060627
DATED : March 31, 2009
INVENTOR(S) : Matthew P. Dugas and Theodore A. Schwarz It is certified that error appears in the above-identified patent and that said Letters Patent is hereby corrected as shown below:

CLAIMS

| Column | Line | PTO | Should Read |
|---|---|---|---|
| 6 | 28 | "staggered, normal to the tape motion." | --staggered, normal to the tape motion segments.-- |

Signed and Sealed this

Nineteenth Day of May, 2009

JOHN DOLL
*Acting Director of the United States Patent and Trademark Office*